United States Patent
Harvey

(10) Patent No.: US 7,911,970 B2
(45) Date of Patent: Mar. 22, 2011

(54) SYSTEMS AND METHODS FOR PRESENTING ELECTRONIC COMMUNICATION PACKETS USING A LOGIC ANALYZER

(76) Inventor: Timothy J. Harvey, Temecula, CA (US)

( * ) Notice: Subject to any disclaimer, the term of this patent is extended or adjusted under 35 U.S.C. 154(b) by 117 days.

(21) Appl. No.: 12/322,409

(22) Filed: Feb. 2, 2009

(65) Prior Publication Data

US 2010/0195512 A1 Aug. 5, 2010

(51) Int. Cl.
*G01R 31/08* (2006.01)
(52) U.S. Cl. .................. 370/252; 370/352; 370/241
(58) Field of Classification Search .............. 370/352, 370/252, 230, 503, 241; 709/224
See application file for complete search history.

(56) References Cited

U.S. PATENT DOCUMENTS

| | | | |
|---|---|---|---|
| 5,959,607 A * | 9/1999 | Montijo | 345/440.1 |
| 2006/0155843 A1* | 7/2006 | Glass et al. | 709/224 |
| 2008/0013456 A1* | 1/2008 | Hafed | 370/241 |
| 2009/0135806 A1* | 5/2009 | Pulhug | 370/352 |

\* cited by examiner

*Primary Examiner* — Ricky Ngo
*Assistant Examiner* — Iqbal Zaidi
(74) *Attorney, Agent, or Firm* — Holland & Hart

(57) ABSTRACT

A method for presenting data via a display on a first computing device according to a user-selected format is described. One of a plurality of data format structures is selected. The structure comprises one or more predetermined data segments according to the selected format. A bus data stream comprising a plurality of data segments is received from a second device. The plurality of data segments being in one of a plurality of possible predetermined formats. The plurality of data segments is decoded in one or more data structures according to the selected format. The contents of the one or more data structures are displayed on a screen. A user analyzes the displayed contents and determines whether to execute debugging operations for the second device according to the contents of the displayed data structures.

18 Claims, 17 Drawing Sheets

SYSTEMS AND METHODS FOR PRESENTING ELECTRONIC COMMUNICATION PACKETS USING A LOGIC ANALYZER

COMPUTER PROGRAM LISTING APPENDIX

The present application incorporates-by-reference the computer program listing appendices contained on two (2) compact discs (CDs) filed herein with the present application. The first CD contains a first file named "PacketPresenterApp.txt" with a size of 99,878 bytes and a second file named "PacketPresenterDLL.txt" with a size of 321,785 bytes. The second CD is a duplicate of the first CD and contains a duplicate copy of the two files mentioned above. The creation date of the first CD and second CD is 30 Jan. 2009.

TECHNICAL FIELD

The present disclosure relates generally to computer and computer-related technology. More specifically, the present disclosure relates to systems and methods for presenting electronic communication packets using a logic analyzer.

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Thus, computer systems are used to carry out a wide variety of business, industry, and academic endeavors.

Often, computer operations may need to be repaired. This may be referred to as "debugging". Often, a technician may connect test equipment to a computer system in order to determine the location of an error or errors. For example, technicians often monitor data communications between components within a computer system. In addition, technicians often monitor data communications between the computer system and another computer system or other automated or digital system. In some prior art systems, the data communications may be carried out via an embedded communications bus. Technicians have thus long sought to locate errors by evaluating these data communications on a bus.

Existing devices that test computing devices have included the capability to decode bus data that is transferred along a communications bus of the device being tested. The communications bus follows a protocol which defines the capabilities and characteristics of the communications bus. There are many types of bus protocols that have long been in use. Some examples of existing bus protocols include Computer Automated Measurement and Control (CAMAC), MBus, Multibus, NuBus, Peripheral Component Interconnect (PCI), SBus, Unibus, PCI Express, Hyper Transport, Serial Peripheral Interface (SPI), FireWire, etc.

Existing bus decoders, however, only understand a single communications bus protocol. Often fields of these protocols contain design specific data that are not interpreted by existing bus decoders. Thus, technicians are currently required to use various decoders depending on the protocol the communications bus is following. In addition, technicians are required to manually parse through design specific data received on the communications bus. For example, technicians currently spend significant amounts of time manually counting bits associated with the design specific bus data and manually decoding these unique bus protocols. Further, existing decoders do not automatically provide the bus data to the technician in recognizable and usable fields that the technician can use to quickly determine if debugging procedures are necessary for the device being tested. Instead, existing decoders typically provide the design specific contents of the bus data as raw streams of bytes contained in data packets. This data is not further decoded into easily understood fields since the protocol decoders do not know the specification of the design specific sections of the packets. Because existing decoders to not automatically provide bus data to the technician in an easy to understand format, technicians are required to manually parse the embedded bus data into data fields that are recognizable and usable by a human. As shown above, the use of existing decoders is inefficient and requires a significant amount of time for the technician to decode the bus data and arrange the decoded data in a recognizable format in order to determine if any debugging processes are needed.

SUMMARY

A method for automatically presenting electronic communication packets in a recognizable format for multiple bus protocols is described. In one embodiment, encoded bus data is received and the bus data is decoded.

The decoded bus data may be converted into communication packets according to a first user-defined file. In some embodiments, the user-defined file defines data fields in which the communication packets may be parsed and displayed to a user. In some embodiment, the first user-defined file may correspond to a first communications bus protocol. In other embodiments, the decoded bus data may be converted into communications packets according to a second user-defined file that is different than the first user-defined file. The second user-defined file corresponds to a second communications bus protocol that is different than the first communications bus protocol. The second user-defined file may define different data fields (according to the second bus protocol) in which the communication packets are passed and displayed to the user. In other words, the user-defined files are customizable to operate under a various bus protocols. In addition, the user-defined files may be customizable to operate under a custom and unique embedded bus protocol.

In some embodiments, the communication packets are displayed in a graphical format. The communication packets may include electronic communication packets and field data structures. In some embodiments, the user-defined file is a text file. In some embodiments, communication packets displayed in a graphical format are recognizable and usable by a user. In some embodiments, a user may create multiple user-defined text files, whereby each user-defined file corresponds to a different communications bus protocol.

In some configurations, traces of the encoded bus data are captured to generate a voltage versus time waveform. A voltage versus time waveform and the decoded bus data may be provided to the display. The user-define file may include instructions to combine a voltage versus time waveform, the decoded bus data, and the communication packets in a single display. Being able to correlate the packet decoder along with the raw decoded stream and the voltage versus time waveform can allow a designer to see where anomalies may be hiding. In addition, combining the voltage versus time waveform, the decoded bus data, and the communications packets in a single display may narrow the cause of problems (i.e., bugs) down to specific transitions on the communication wire.

The user-defined file may include a protocol for an embedded communications bus. The protocol for an embedded communication bus may be the protocol for a controller-area network (CAN) bus, a Universal Serial Bus (USB), a 12C bus, an Async bus, a parallel bus, a 1-wire bus, a Serial Peripheral Interface (SPI) bus, a system management (SM) bus, or a serial bus.

A testing device that is configured to present electronic communication packets is also described. The testing device includes a processor and memory in electronic communication with the processor. The testing device also includes a logic analyzer module (or other application segment) configured to receive encoded bus data, decode the bus data, convert the decoded bus data into communication packets according to a user-defined file, and provide the communication packets to a display according to the user-defined file.

A computer-readable medium comprising executable instructions is also described. The instructions may be executable to receive encoded bus data, decode the bus data, convert the decoded bus data into communication packets according to a user-defined file, and provide the communication packets to a display according to the user-defined file.

It is to be understood that the foregoing Background recites some aspects of the art, and this Summary recites only some features of some embodiments of this specification. There are other novel features, embodiments, and advantages that will become apparent as the specification proceeds. Thus, the foregoing Summary and Background are not themselves limiting. Rather, the scope of the invention is to be determined by the claims as issued and not by whether a given claim addresses any aspect recited in the Background or this Summary.

BRIEF DESCRIPTION OF THE DRAWINGS

The applicant's preferred and other embodiments are shown in the accompanying drawings. Together with the following description, these drawings demonstrate and explain various aspects of the instant disclosure.

Figure 1:
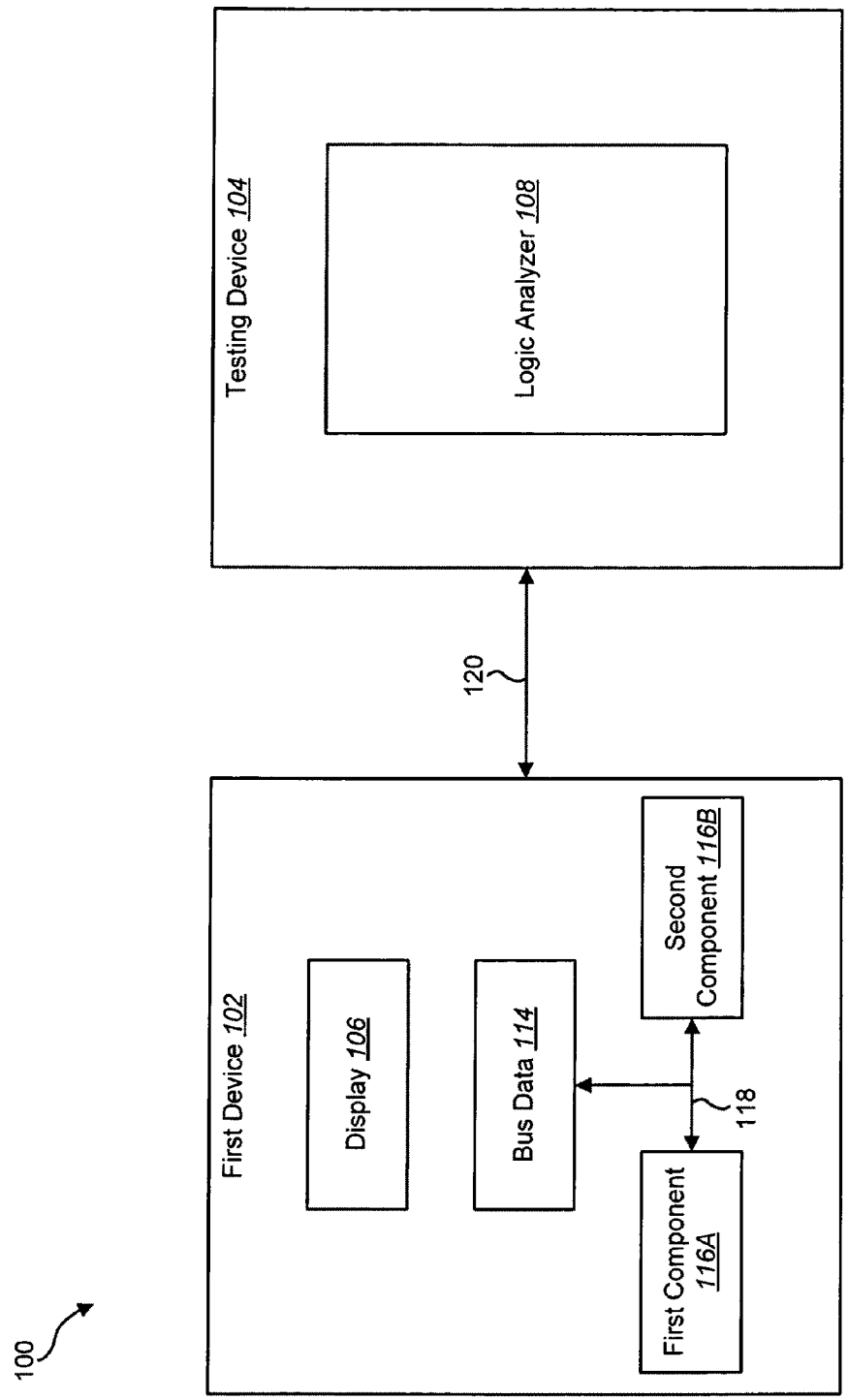
FIG. 1 is a block diagram illustrating one embodiment of a device testing system.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

FIG. 1 is a block diagram illustrating one embodiment of a device testing system 100. The testing system 100 may include a first device 102 and a testing device 104. The devices 102, 104 may be connected via a Universal Serial Bus (USB) connection 120. The first device 102 may be the device that is being tested and the testing device 104 may perform the testing procedures.

In one embodiment, the first device 102 may be a computing device, such as a personal computer (PC), laptop, supercomputer, personal digital assistant (PDA), cell phone, or any other type of computing device. The first device 102 may include several components to carry out the various functions of the device 102. As illustrates, the first device 102 may include a first component 116A and a second component 116B. While only two components are illustrated, the device 102 may include more than two components.

In one embodiment, a bus 118 transfers data between the first component 116A and the second component 116B. In one configuration, the bus 118 is a subsystem that may transfer data between components inside a computing device or between computing devices. The bus 118 may also transfer data between the first device 102 and a separate device (not shown). The bus 118 may be a controller-area network (CAN) bus, a USB bus (such as the USB connection 120 connected the first device 102 and the testing device 104), a 12C bus, an async bus, a parallel bus, a 1-wire bus, a Serial Peripheral Interface (SPI) bus, a system management (SM) bus, a serial bus, and the like. Data being transferred across the bus 118 may be referred to as bus data 114.

The testing device 104 may include a logic analyzer module 108. The logic analyzer 108 may receive the bus data 114 via the USB connection 120. In one embodiment, the logic analyzer 108 analyzes the received bus data 114 and displays the results to a user via a display 106 on the first device 102.

In one configuration, the display 106 may be external and separate from the first device 102. A user may then view the results via the display 106 and perform any necessary debugging operations based on the displayed results. Debugging may be performed by viewing and analyzing the displayed results and relating the results back to logic analyzer 108 waveforms and decoded bus traffic for various types of busses. For example, a user may view a display of HDLC communication packets and correlate that display back to the raw byte stream that was decoded from an ASYNC bus, as well as the voltage-versus-time waveforms of the bus Tx and Rx lines. In one embodiment, the present systems and methods run alongside existing bus decoders and takes the output of raw binary data from the bus decoders and parses the stream according to a user-defined definition file for the intent of displaying the communications in graphical displays. Details regarding the logic analyzer 108 will be discussed below.

Figure 2:
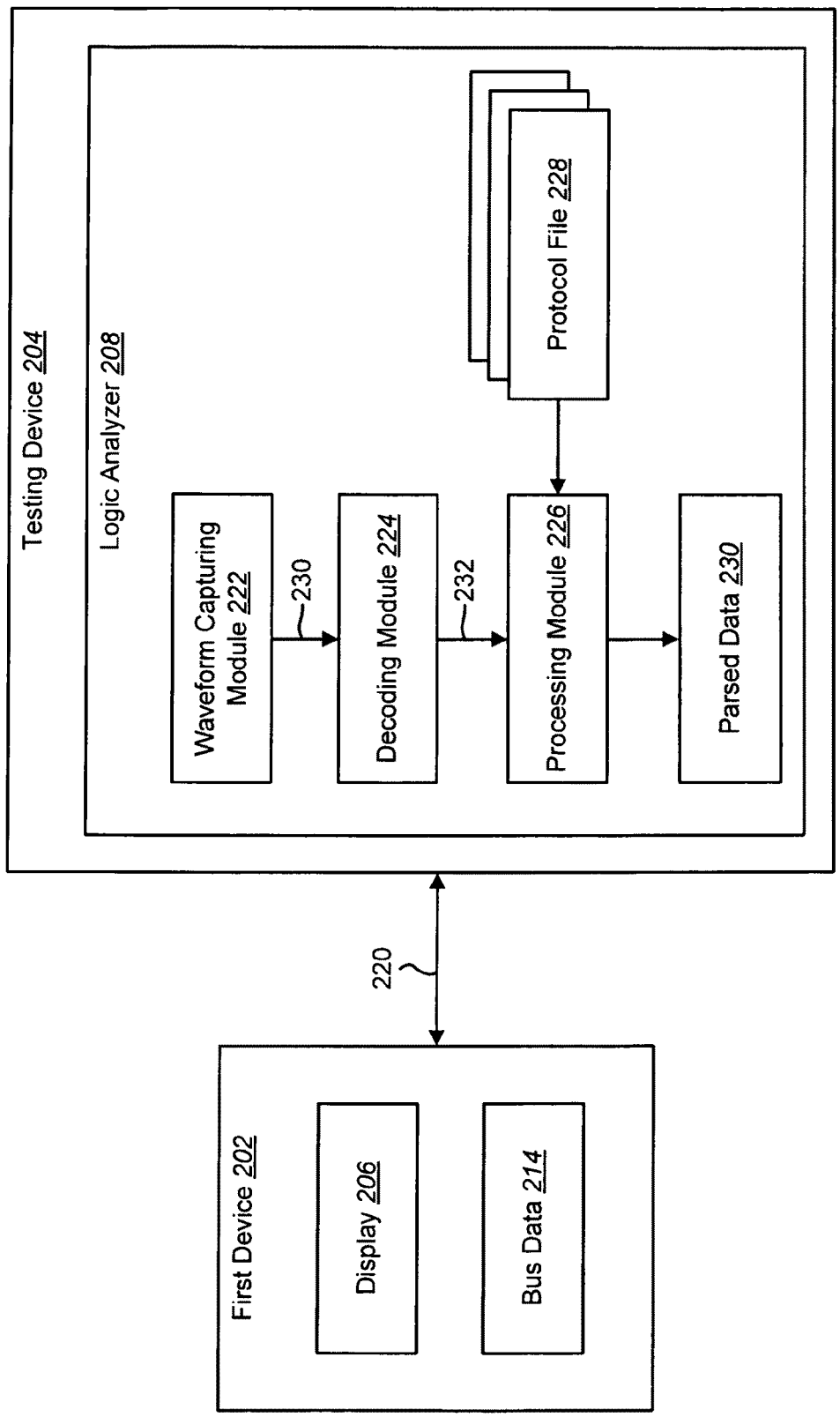
FIG. 2 is a block diagram illustrating a further embodiment of the device testing system depicted in FIG. 1.

FIG. 2 is a block diagram illustrating a further embodiment of a device testing system 200. A first device 202 and a testing device 204 may be connected via a USB connection 220. A logic analyzer 208 may receive bus data 214 from the first device 202. As previously explained, the bus data 214 may be the data transferred from one component to another component within the first device 202 over an embedded communications bus (not shown).

In one embodiment, the logic analyzer 208 includes a waveform capturing module 222. The capturing module 222 may capture a trace of voltage versus time waveforms of the signals of the embedded communications bus on the first device 202. For example, the bus data 214 may be signal of the bus that are used by the capturing module 222 to provide voltage versus time waveforms. In one embodiment, the bus data 214 may be encoded bus data 230. In one embodiment, the encoded bus data 230 may be decoded by a decoding module 224. The decoding module 224 decodes the encoded bus data 230 in order to provide the actual data on the communications bus.

In one embodiment, decoded bus data 232 may be further processed by a processing module 226. The processing module 226 may parse the decoded bus data 232 into data fields as parsed data 230. The data fields may be readable by a user.

The processing module 226 may receive raw binary data (e.g., the decoded bus data 232) from the output of the decoding module 224 and parse the stream according to a user-defined protocol file 228. The protocol file 228 may specify the data fields within a certain protocol. For example, protocols may be defined using a text file, which may specify the fields within the protocol. The file 228 may also define how to display the data fields on a display 206. The files 228 may be in a text format and may be created or edited using a text editor application. In one embodiment, the protocol file 228 may correspond to a single bus type. In other words, the logic analyzer 208 may include multiple protocol files 228, one for each different type of embedded communications bus. The processing module 226 may receive the decoded data 232, access the protocol file 228 corresponding to the type of bus from which the decoded bus data 232 originated, and break the decoded bus data stream 232 into packets. The processing module 226 may parse the packets into data fields and display the data fields on the display 206 according to the definitions provided by the protocol file 228. A user may then look at the display 206 to view the displayed communication packets in the data fields. The user may analyze the data fields to determine whether debugging operations for the components communicating over the embedded bus are necessary. Since the user is typically the designer of the circuit, the user may be able to determine if the operation presented by the visualized packets is correct based on the stimulus given to the circuit under test. In another embodiment, some or all of the data fields may be ignored and/or sent to a new protocol for further processing.

In one embodiment, the testing device 204 may be stand-alone test equipment that is not based on the operating system of the first device 202. In other words, the testing device 204 may run the functions of the logic analyzer 208 and display the results. In another embodiment, a separate logic analyzer 208 may be used to port a data stream to a stand-alone processing module 226 on the first device 202.

Figure 3:
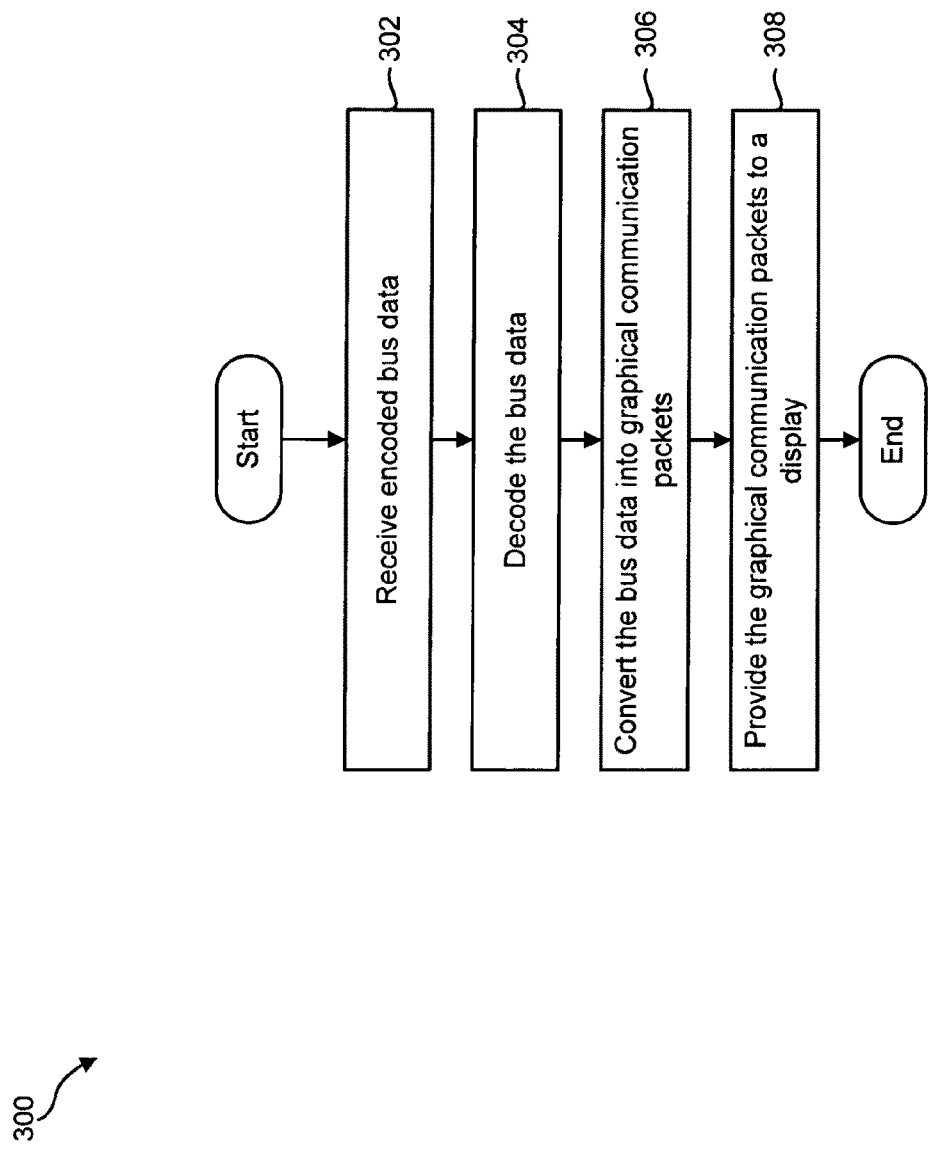
FIG. 3 is a flow diagram illustrating one embodiment of a method for presenting communication packets to a user according to a user-defined protocol file.

FIG. 3 is a flow diagram illustrating one embodiment of a method 300 for presenting communication packets to a user according to a user-defined protocol file. The method 300 may be implemented by the logic analyzer 108 previously described. In one embodiment, encoded bus data may be received 302. For example, the encoded bus data 302 may be captured by the waveform capturing module 222 over a USB connection 120. The encoded bus data may be decoded 304 by a bus decoding module 224. In one embodiment, the decoded bus data may be converted 306 into graphical communication packets. For example, the processing module 226 may convert 306 the decoded bus data into graphical communication packets that may be easily read by a user.

The bus data may be converted 306 in accordance with a user-defined protocol file 228 that is specific to the type of bus data. In one embodiment, the graphical communication packets may be provided 308 to a display 106. The format and order in which the packets are displayed may be defined by the protocol file 228. A user may view the packets via the display 106 in order to determine whether debugging operations are necessary. In one embodiment, a user may search for a particular data packet using one or more filters. The desired data packets may then be provided 308 to the display 106. A user may then be able to determine whether the operation presented by the visualized packets is correct based on a stimulus given to the circuit under test. In some embodiments, the protocol file 228 may include instructions to combine a voltage versus time waveform, the decoded bus data, and the communication packets in a single display. Being able to correlate the packet decoder along with the raw decoded stream and the voltage versus time waveform can allow a designer to see where anomalies may exist. In addition, combining the voltage versus time waveform, the decoded bus data, and the communications packets in a single display may allow the user to narrow the cause of problems (i.e., bugs) down to specific transitions on the communication wire.

Figure 4:
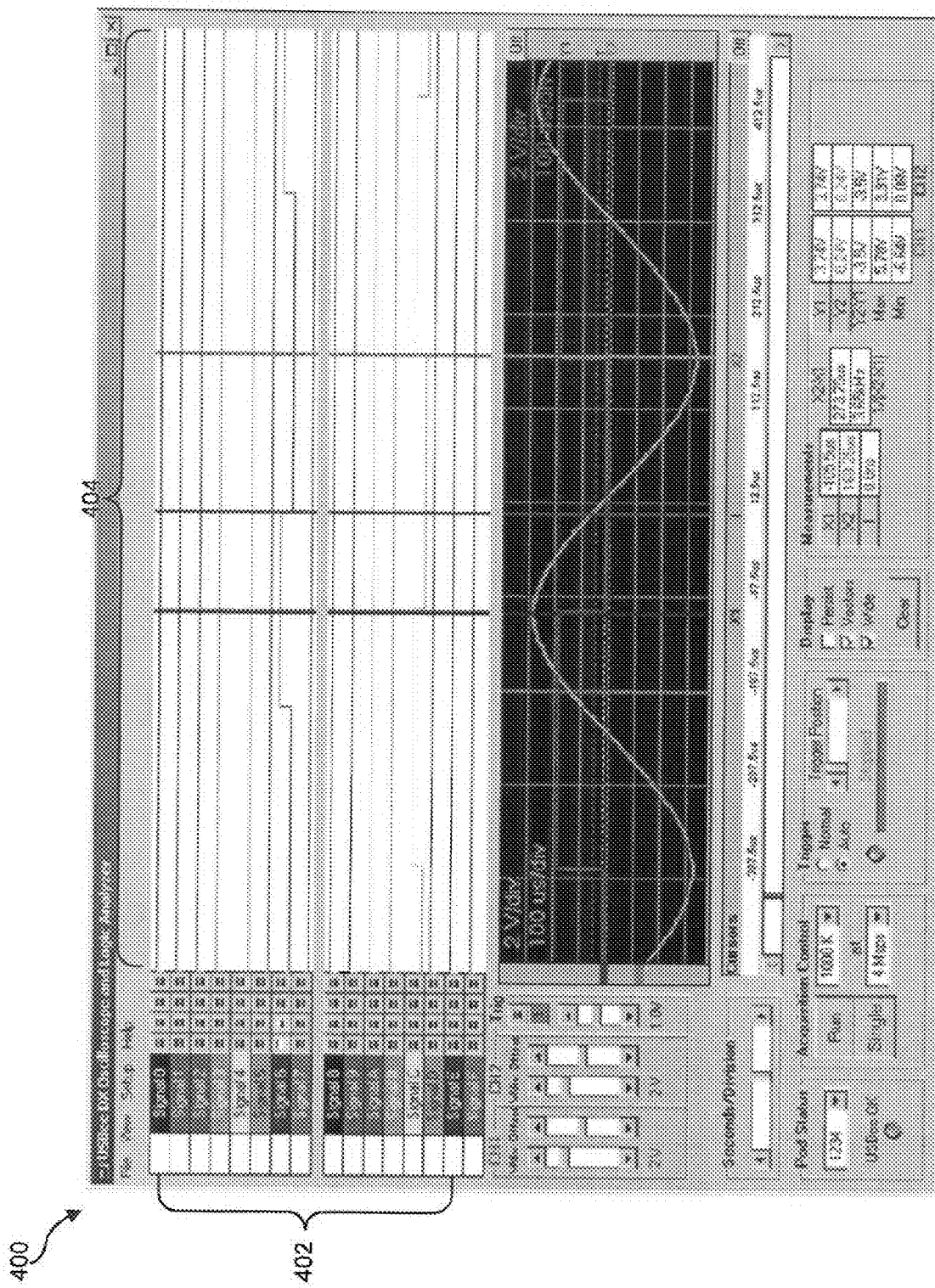
FIG. 4 is a screenshot illustrating one example of a captured waveform of voltage versus time for one or more bus signals according to the user-defined protocol file.

FIG. 4 is a screenshot 400 illustrating one example of a captured waveform of voltage versus time for one or more bus signals 402. A user may select the bus signals 402 that are to be captured. The selected bus signals may then be displayed as waveforms 404 in a display. In one embodiment, the waveform capturing module 222 captures the traces of the selected signals 402 in order to generate the displayed waveforms 404.

Figure 5:
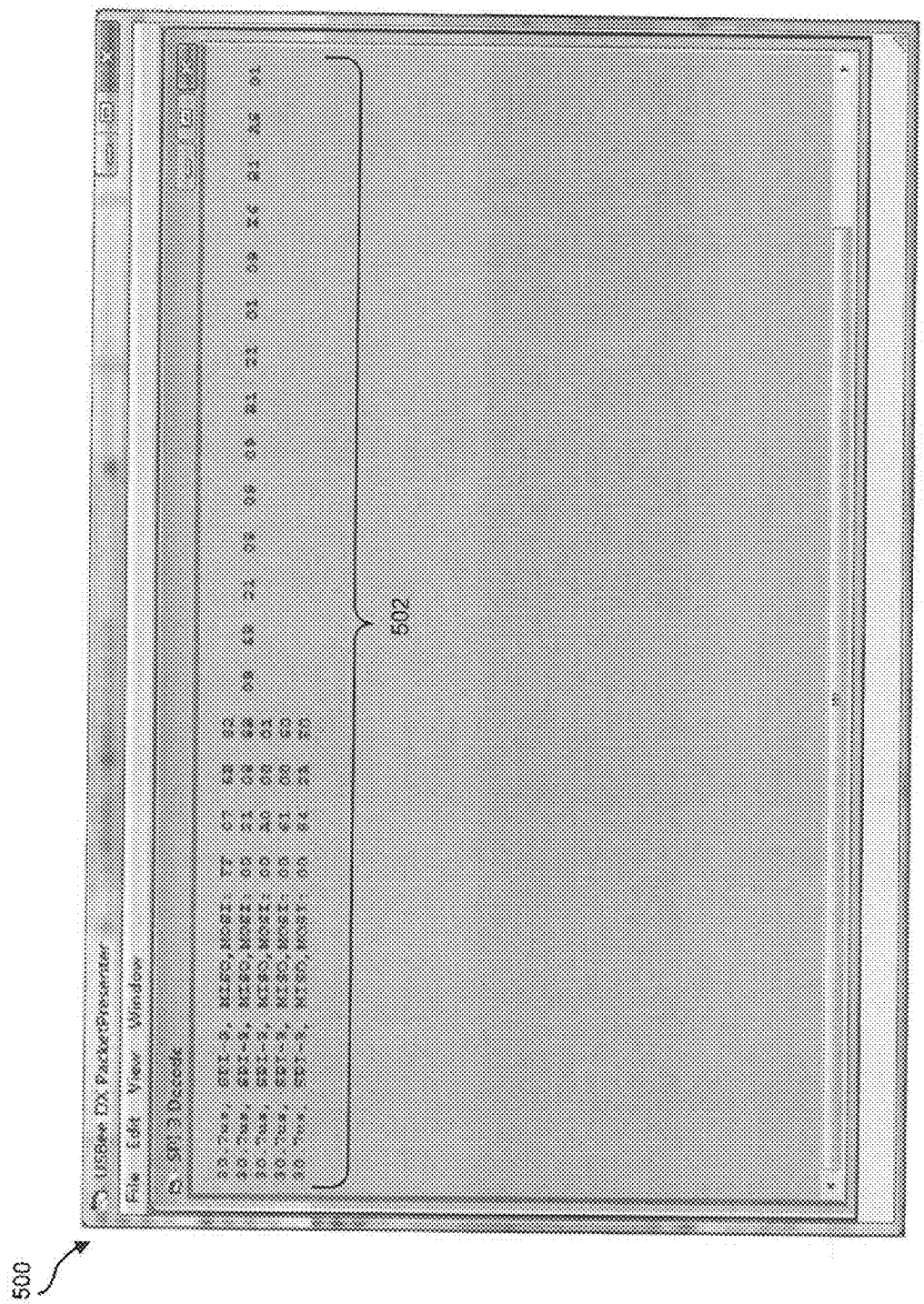
FIG. 5 is a screenshot illustrating one example of decoded bus data.

FIG. 5 is a screenshot 500 illustrating one example of decoded bus data. In one embodiment, a user may select certain portions of data from the captured waveforms 404 illustrated in FIG. 4. The decoding module 224 may provide decoded data 502 to a display. The output of the decoding module 224 may be displayed to a user in a manner illustrated by the screenshot 500.

Figure 6:
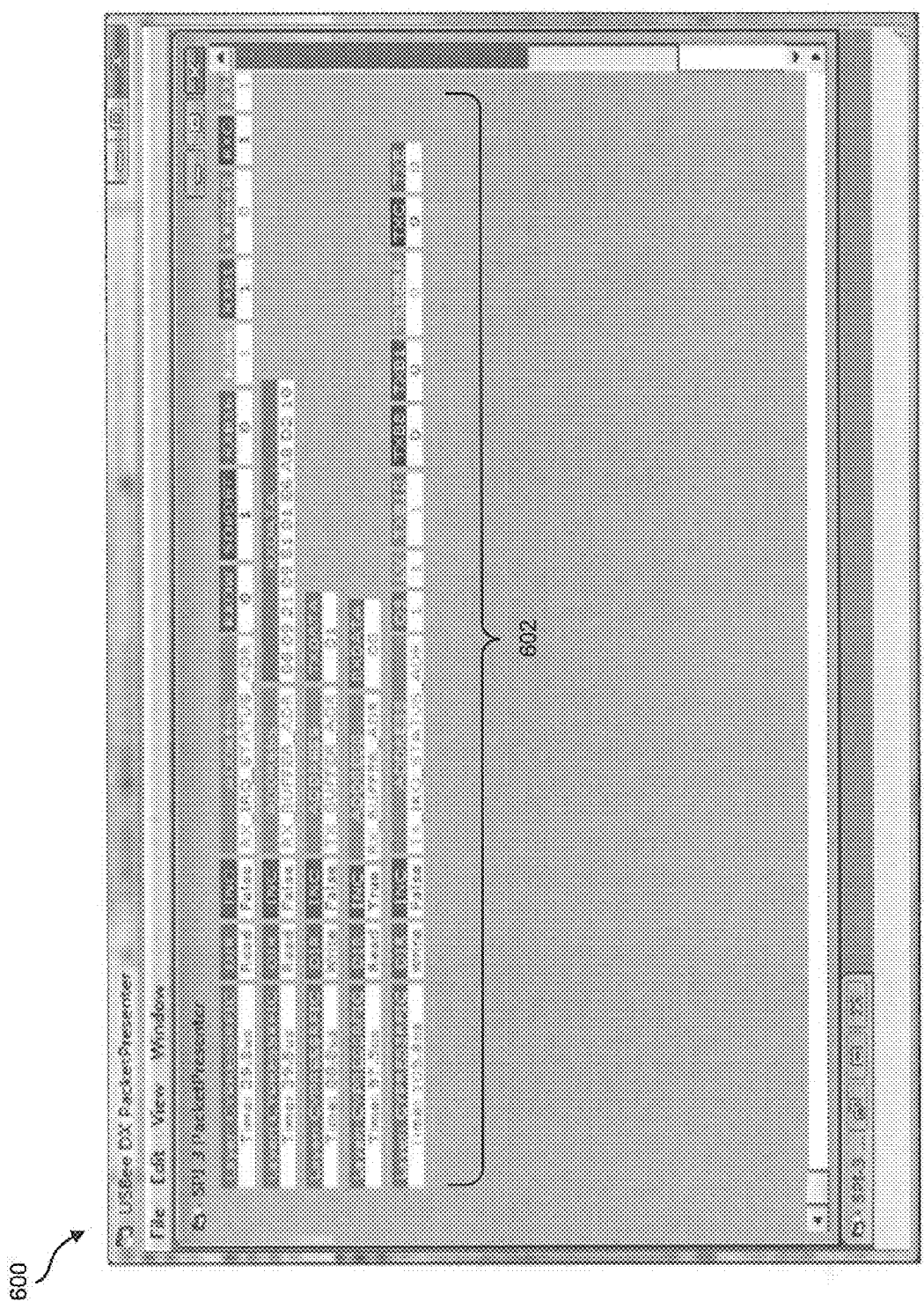
FIG. 6 is a screenshot illustrating one embodiment of a graphical communication packet display in accordance with the user-defined protocol file.

FIG. 6 is a screenshot 600 illustrating one embodiment of a graphical communication packet display 602. The processing module 226 may receive raw decoded data from the decoding module 224 and parse the data into fields. The data fields may then be presented to a user as the graphical communication packet display 602. As previously explained, the data may be parsed and displayed according to a user-defined protocol file 228.

Figure 7:
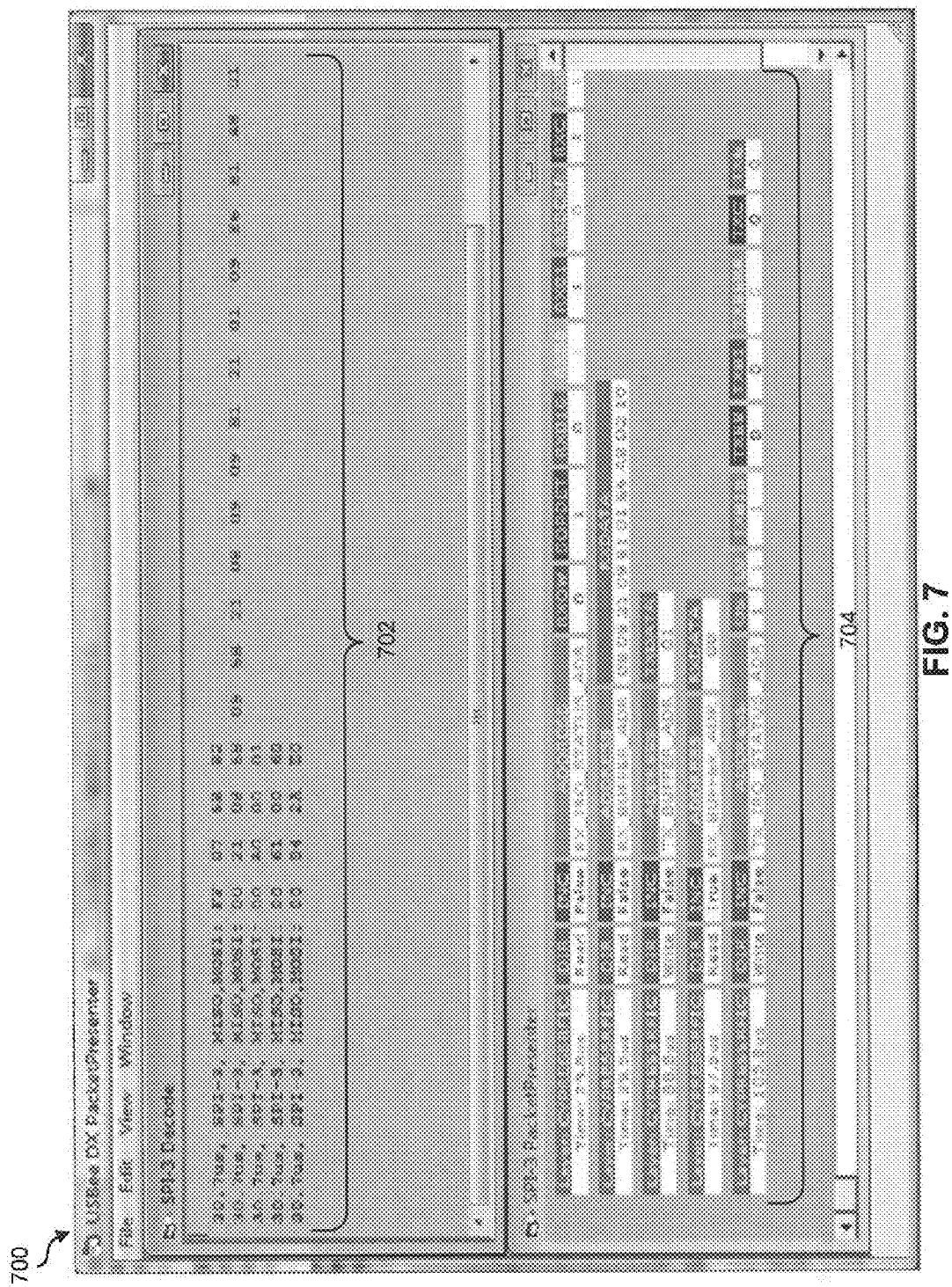
FIG. 7 is a screenshot illustrating a combination display of the decoded bus data of FIG. 5 and the graphical communication packet display of FIG. 6.

FIG. 7 is a screenshot 700 illustrating a combination display of decoded data 702 and a graphical communication packet display 704. In one embodiment, a user may select to view the graphical display 704 together with the raw decoded data 702. The combination display may allow a user to decipher whether debugging operations for an embedded communications bus are necessary.

Figure 8:
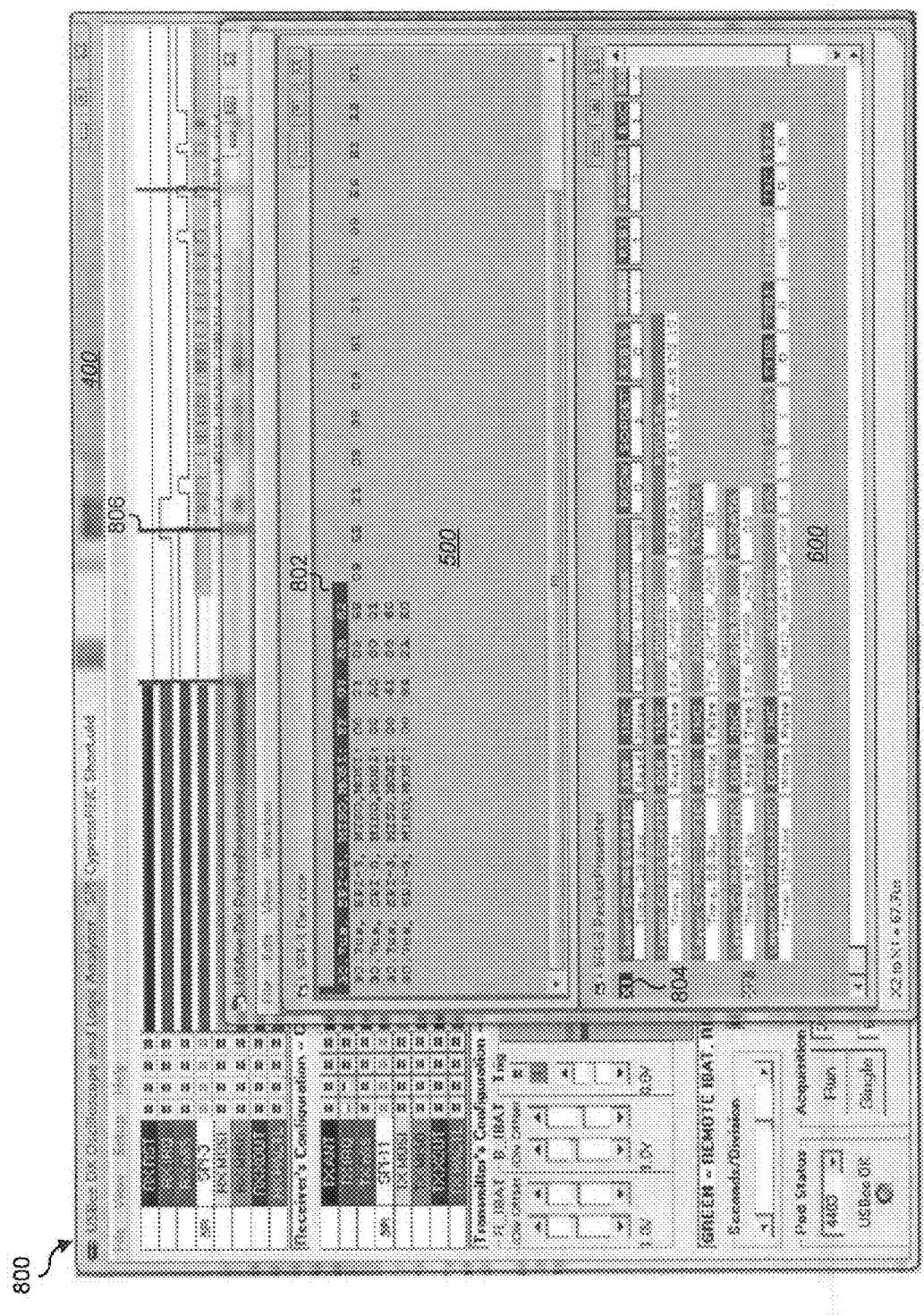
FIG. 8 is a screenshot illustrating a combination display of the waveform display of FIG. 4, the decoded bus data display of FIG. 5, and the graphical communication packets display of FIG. 6.

FIG. 8 is a screenshot 800 illustrating a combination display of a waveform display 400, a decoded data display 500, and a graphical communication packets display 600. A user may select a communications packet 802 and the corresponding raw decoded data 804 may be highlighted in the decoded data display 500. The waveform display 400 may be shifted to the so that the start 806 of the selected packet 804 is in the center of the waveform display 400. The combination display illustrated in FIG. 8 may allow a user to correlate what is displayed in the graphical display 600, the decoded data display 500, and the waveform display 400. The user may then analyze the combination display to determine whether debugging operations are necessary. For example, high-level data link control (HDLC) communication packets may be displayed via the graphical communication packets display 600. A user may correlate the display of the HDLC packets to a decoded data display 500 that displays a raw byte data stream that was decoded from an Async bus. In addition, a user may correlate the display of the HDLC packets to the waveform display 400 which displays voltage versus time waveforms of the bus Tx and Rx lines.

In one embodiment, the combination display may also include statistical computation on packet cumulative contents. In addition, the combination display may include on screen packet contents to bus protocol specification cross references. Further, the combination display may include error reports based on protocol specification violations. Some examples of statistical computations may include the number of packets per second of a certain type, minimum and maximum time between related packets, or total packets containing errors over the testing period. Some examples of specification cross references may include links to the actual specification page for a given field, bit, or packet. In addition, some examples of protocol violations may include parity errors, retransmissions, bit errors, CRC or checksum errors, NAKs or Stalls, etc.

In one configuration, the contents of the output window displays 400, 500, 600, 700, 800 may be copied to other programs. For example, the displays may be copied as screenshots and pasted as an image into another program that accepts images. In addition, text within the output window displays may be copied and pasted into other programs. Further, the output may be saved to either a Text file or a Rich Text Format (RTF) file. In one embodiment, saving data to an RTF file format may save the graphical nature of the packets and may be, for example, read by word processing programs or other programs such as spreadsheet programs.

Figure 8A:
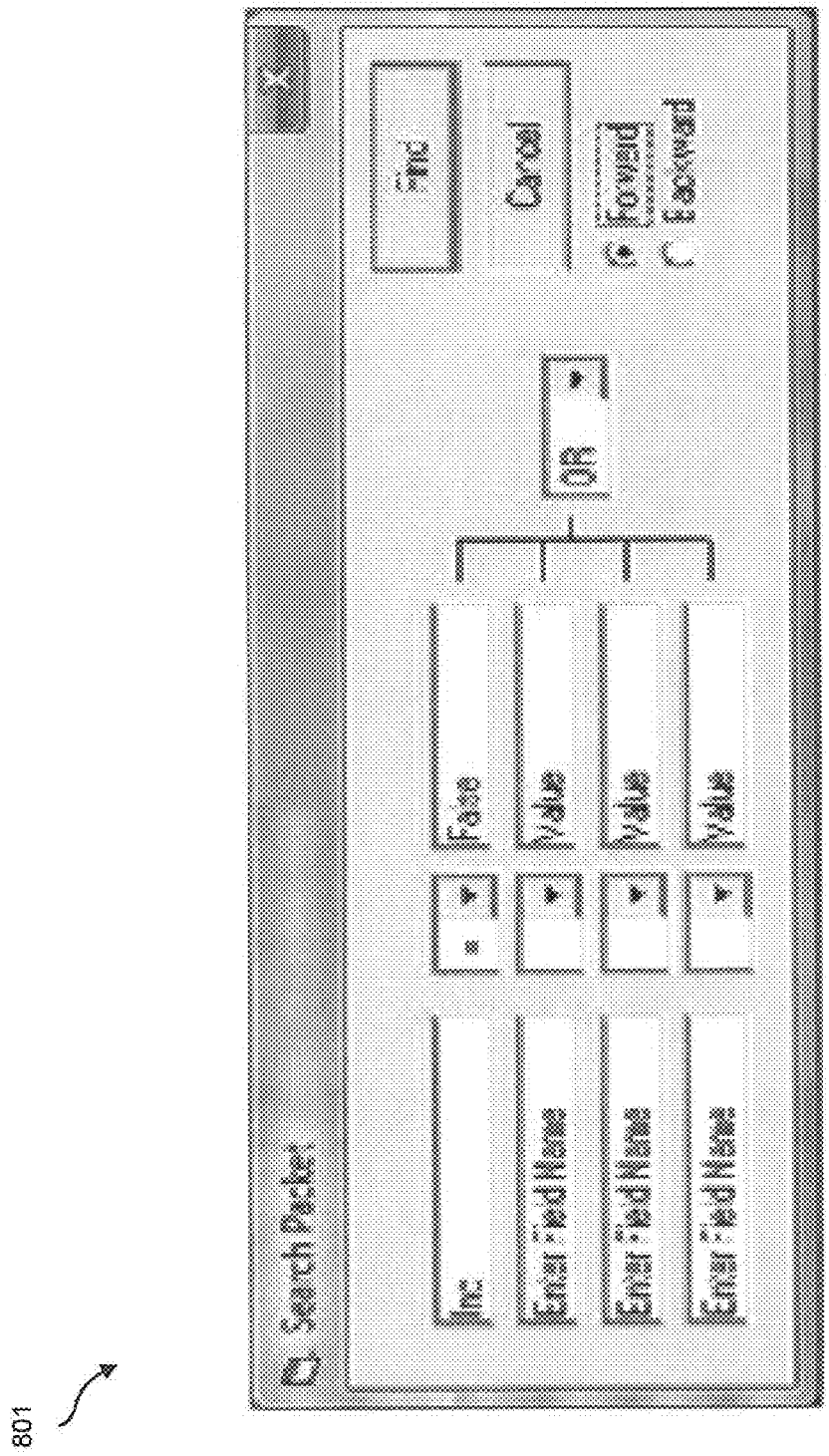
FIG. 8A illustrates one embodiment of a search packet module with data fields to allow a user to search for a particular communications packet.

FIG. 8A illustrates one embodiment of a search packet module 801. The search packet module 801 may be used to search for communication packets that include certain data fields. For example, using the leftmost textboxes, a Field Label may be entered. A comparator operator (e.g., equals, not equals, less than, greater than, etc.) may be selected and finally the value that the field is to be compared against is selected.

Figure 8B:
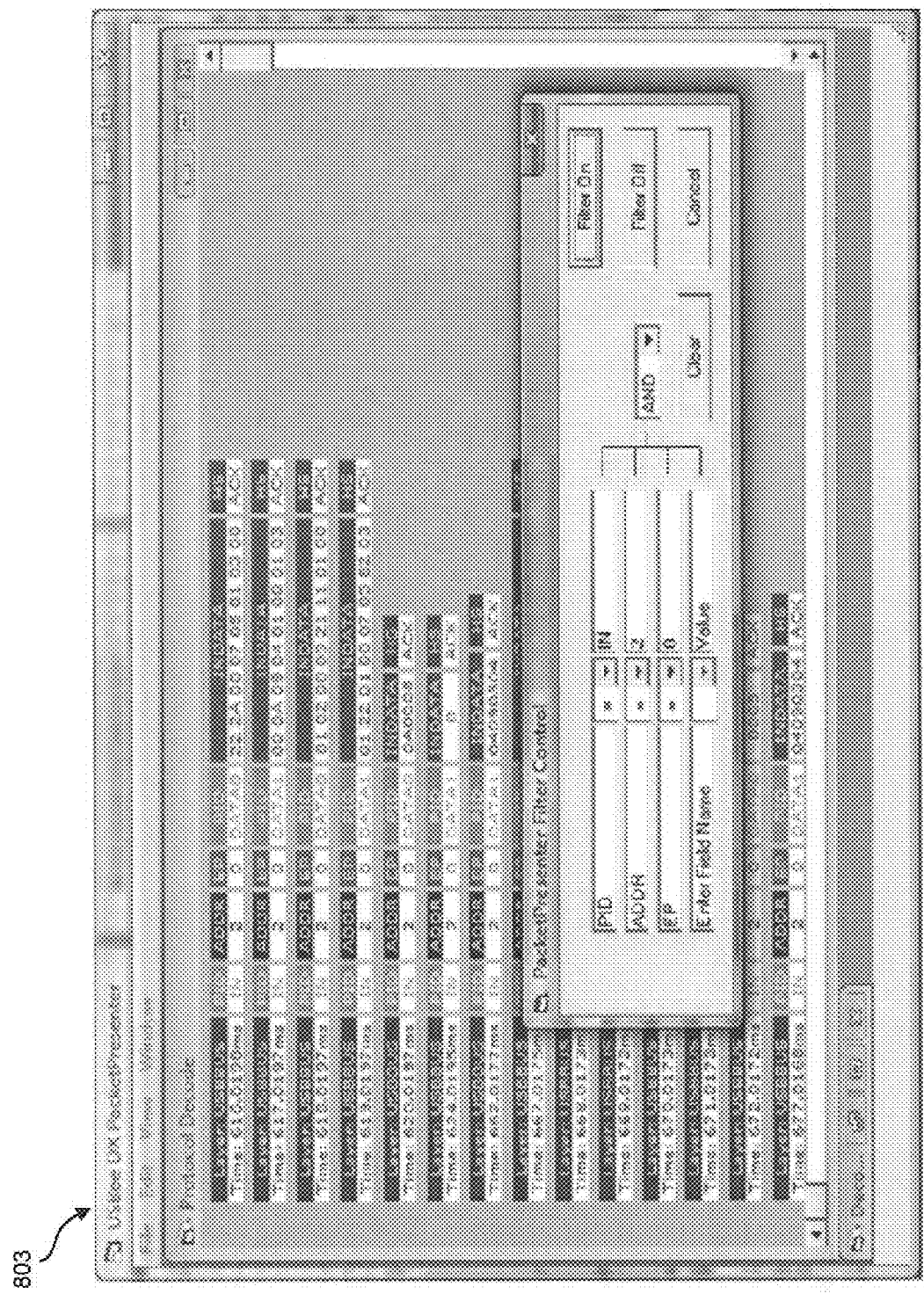
FIG. 8B illustrates one embodiment of a filtering packets module with data fields to allow a user to filter communications packets that are displayed in the graphical communications packet display of FIG. 6.

FIG. 8B illustrates one embodiment of a filtering packets module 803. The filtering module 803 may allow a user to filter communication packets in order to only display packets that include certain fields that match a certain criteria. For example, using the leftmost textboxes, a Field Label may be entered. A comparator operator (e.g., equals, not equals, less than, greater than, etc.) may be selected and finally the value that the field is to be compared against is selected. The filtering module 803 may be activated or deactivated.

Figure 8C:
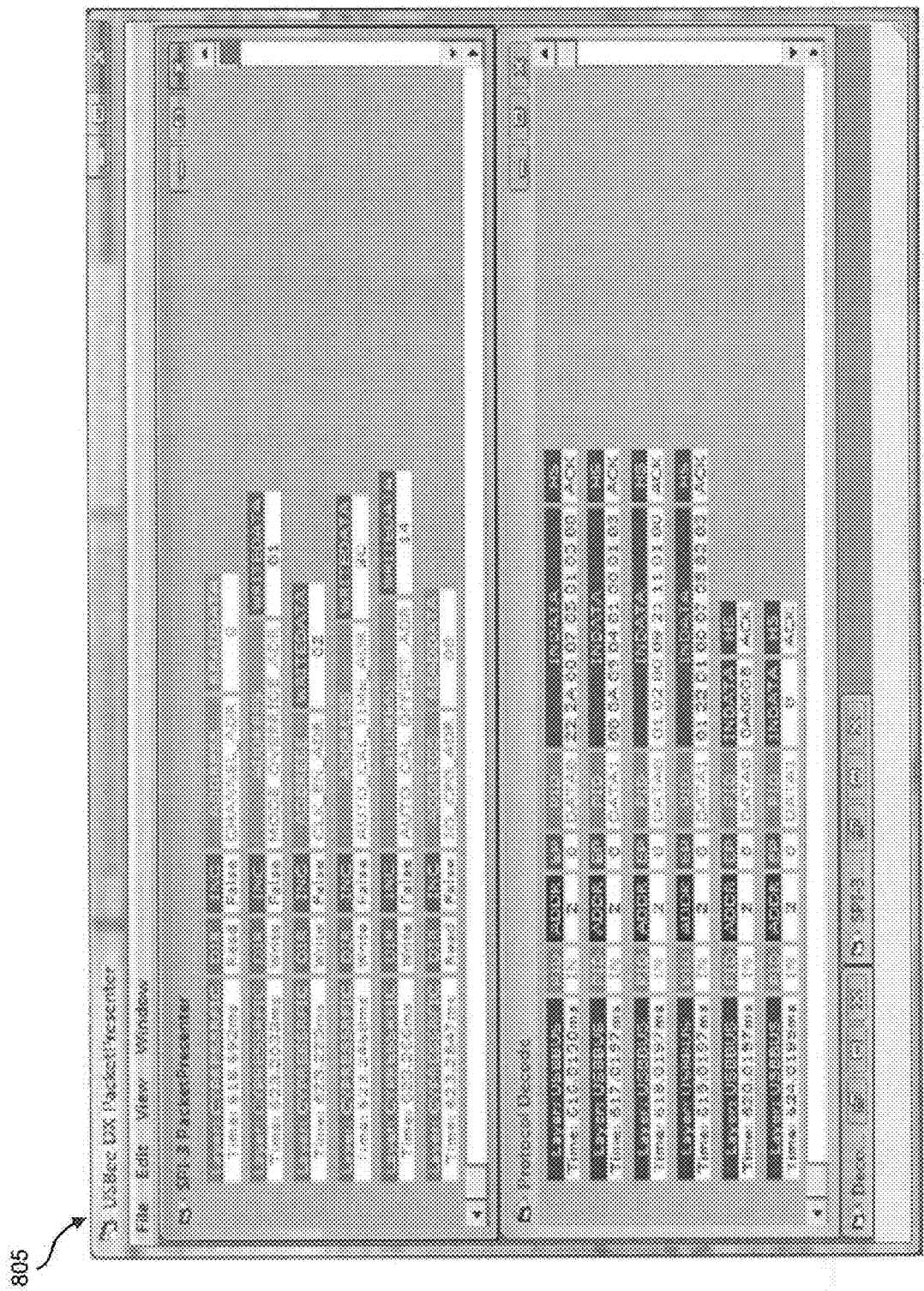
FIG. 8C illustrates one embodiment of a decode display to display decoded bus data to a user using horizontal windows.
Figure 8D:
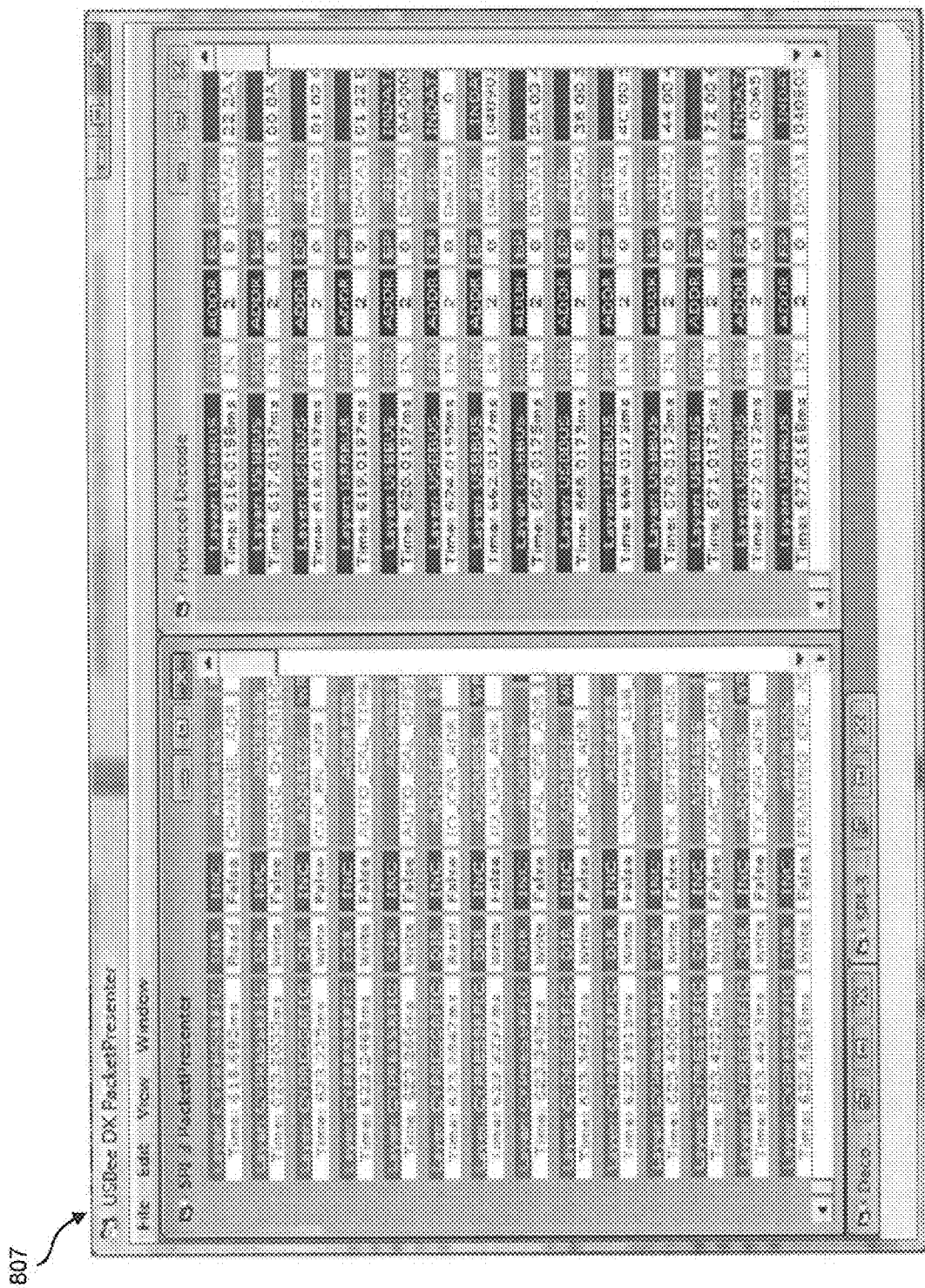
FIG. 8D illustrates another embodiment of the decode display to display decoded bus data to a user using vertical windows.
Figure 8E:
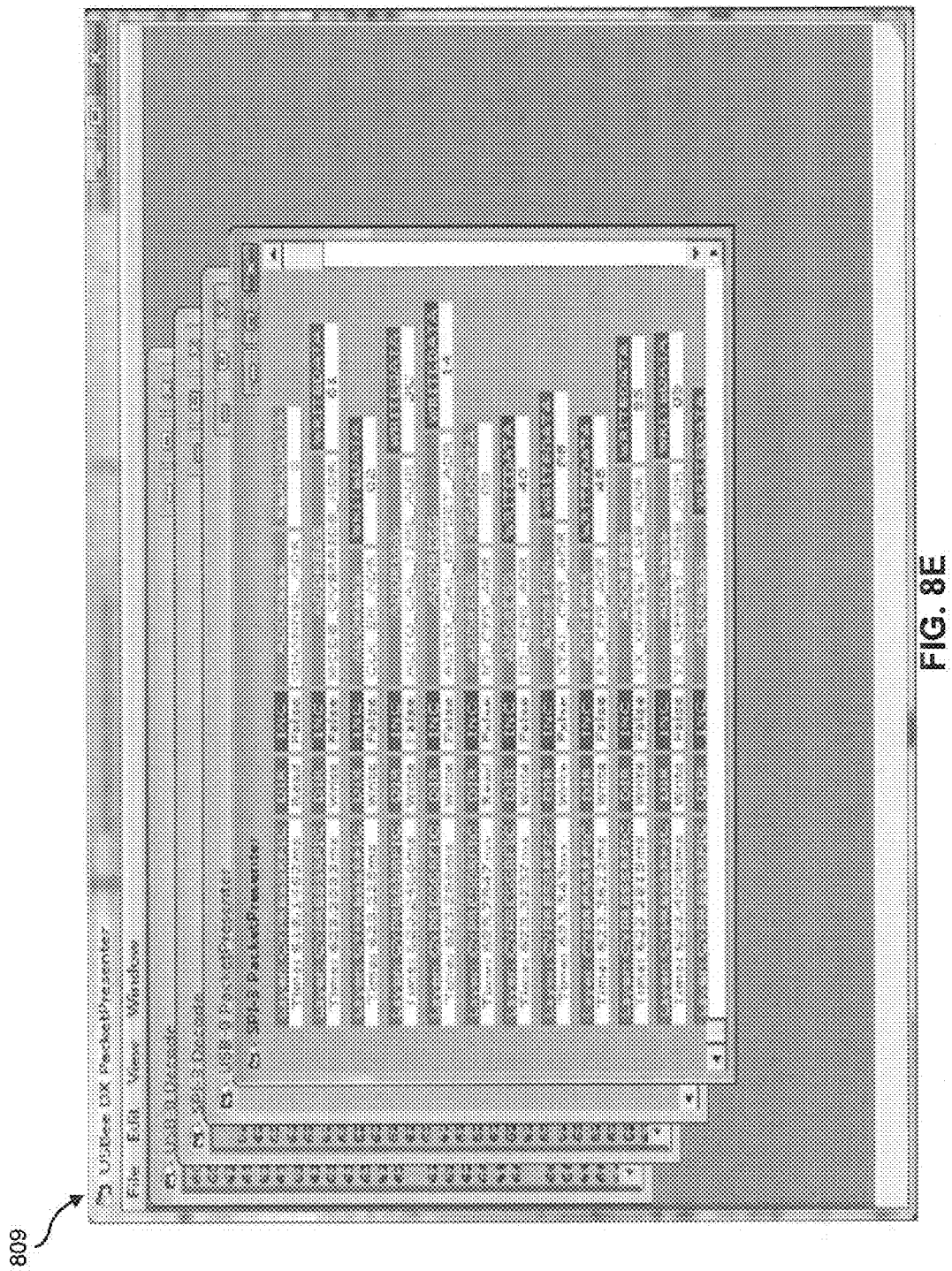
FIG. 8E illustrates a further embodiment of the decode display to display decoded bus data to a user using multiple windows.

FIGS. 8C, 8D, and 8E illustrate one embodiment of multiple decode displays 805, 807, 809. As illustrated, a user may view the output windows as a horizontal display 805, a vertical display 807, or a cascaded display 809.

Figure 8F:
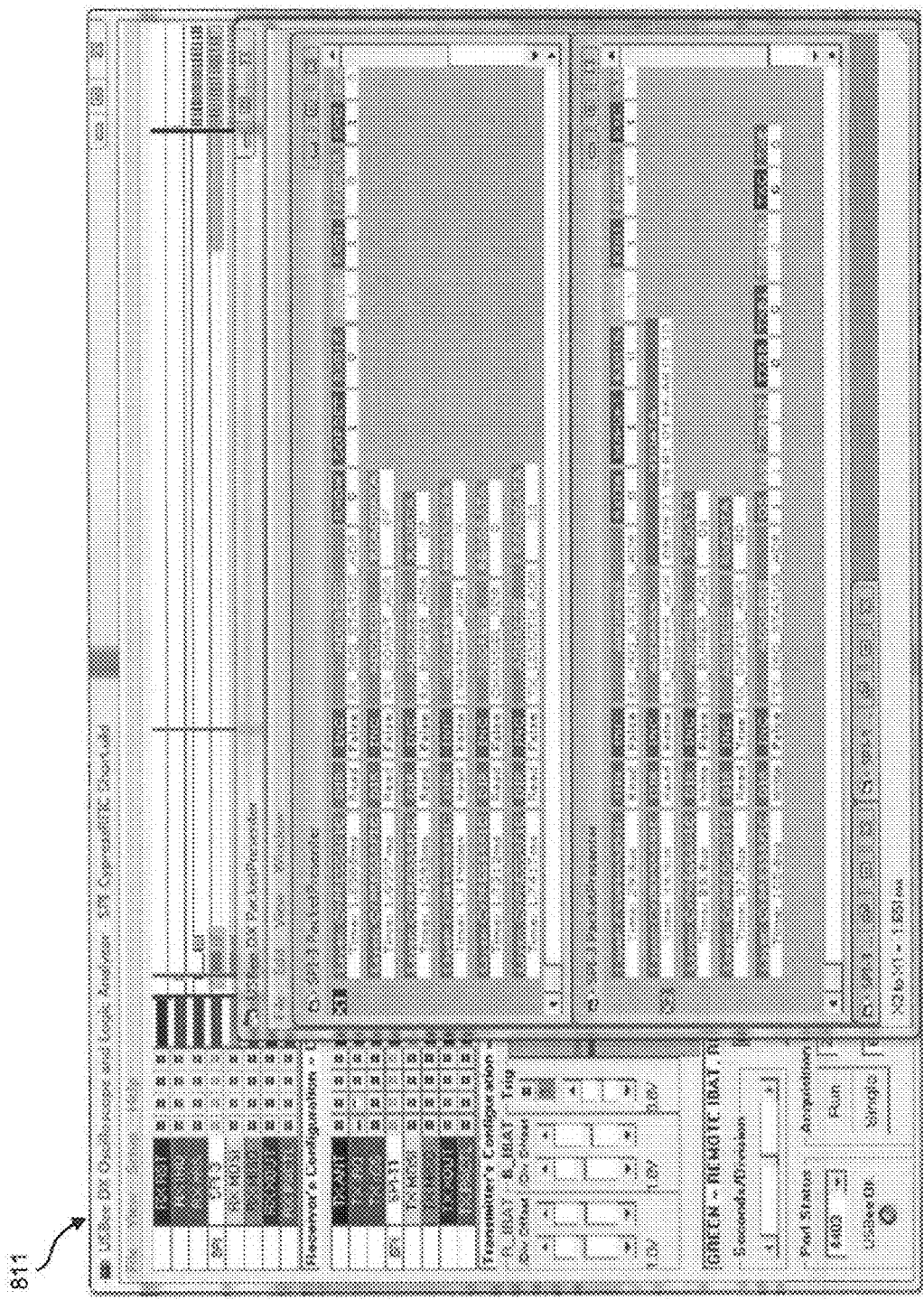
FIG. 8F illustrates one embodiment of a display module that allows a user to place cursors with certain communication packets.

FIG. 8F illustrates one embodiment of a display module 811 that allows a user to place cursors with certain communication packets. For example, a user may place a computer mouse peripheral over the packet and click the left or right button of the mouse. The cursors may be placed a the beginning of the communication packets. The resulting difference between cursors may be displayed at the bottom of the display module 811. If more than one bus is being shown, a user may measure the time between packets on different busses using the cursors.

In one embodiment, the software and modules described above may be implemented by a USBee DX analyzer available from CWAV, Inc. located in Temecula, Calif. The software and modules described above may also may implemented on other logic analyzers by changing a few sections of the provided source code. First, the initialization code that sets up the communication to the logic analyzer device (i.e., the USBee DX) is replaced with the initialization code of the third party analyzer. The location of the initialization code of the third party analyzer may vary from one analyzer to another. By replacing the initialization code, communications may be established with the third party analyzer. Second, the data acquisition section in the code for the logic analyzer device (indicated by the subroutine "StartCapture") is replaced with the data acquisition section in the code for the third party analyzer. The location of the data acquisition section may vary from one third party analyzer to another. Third, the section of the code that formats the data from the logic analyzer (indicated by the subroutine "HandleData( )") is replaced with the section of code for formatting the data from the third party analyzer. By completing this third step, the sample data format from the third party logic analyzer may be converted into the existing PacketPresenter buffer format. Completion of some or all of these steps allows the software and modules described above to operate with any existing third party logic analyzer.

Figure 9:
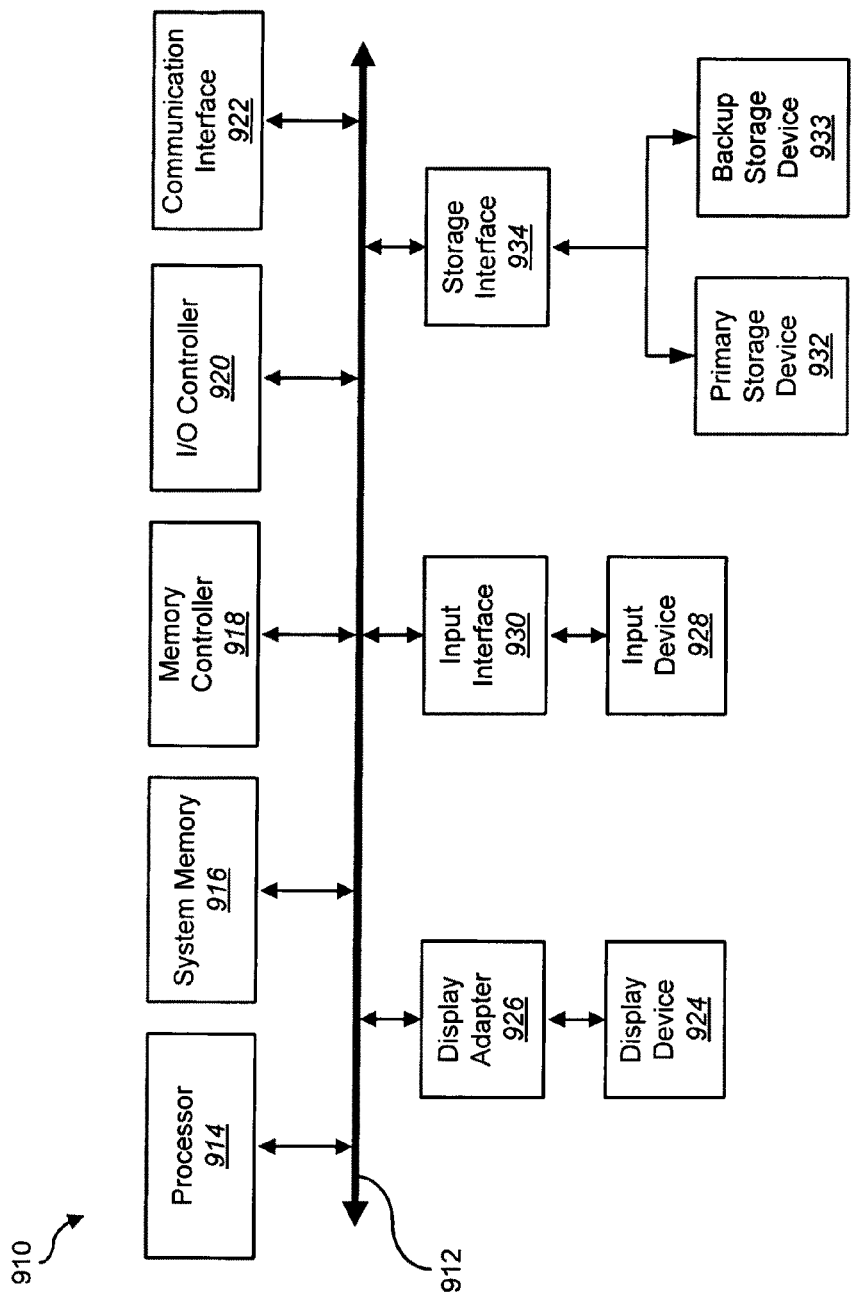
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may comprise at least one processor 914 and system memory 916. An exemplary environment in which the software runs may be a Windows® Vista Professional SP1 based Gateway Personal Computer. The software does not require any other software than what is provided in the operating system of the software package itself as compiled using the Mircosoft® Visual Studio development environment.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may comprise both a volatile memory unit (such as, for example, system memory 916) and a non-volatile storage device (such as, for example, primary storage device 932, as described in detail below).

In certain embodiments, exemplary computing system 910 may also comprise one or more components or elements in addition to processor 914 and system memory 916. For example, as illustrated in FIG. 9, computing system 910 may comprise a memory controller 918, an I/O controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller 918 may perform and/or be a means for performing, either alone or in combination with other elements, one or more of the steps or features described and/or illustrated herein.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934. I/O controller 920 may also be used to perform and/or be a means for performing steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network comprising additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. Communication interface 922 may also be used to perform and/or be a means for performing steps and features set forth in the instant disclosure.

As illustrated in FIG. 9, computing system 910 may also comprise at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also comprise at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform steps and features set forth in the instant disclosure.

As illustrated in FIG. 9, exemplary computing system 9010 may also comprise a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also comprise other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems. Storage devices 932 and 933 may also be used to perform and/or be a means for performing steps and features set forth in the instant disclosure.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

Figure 10:
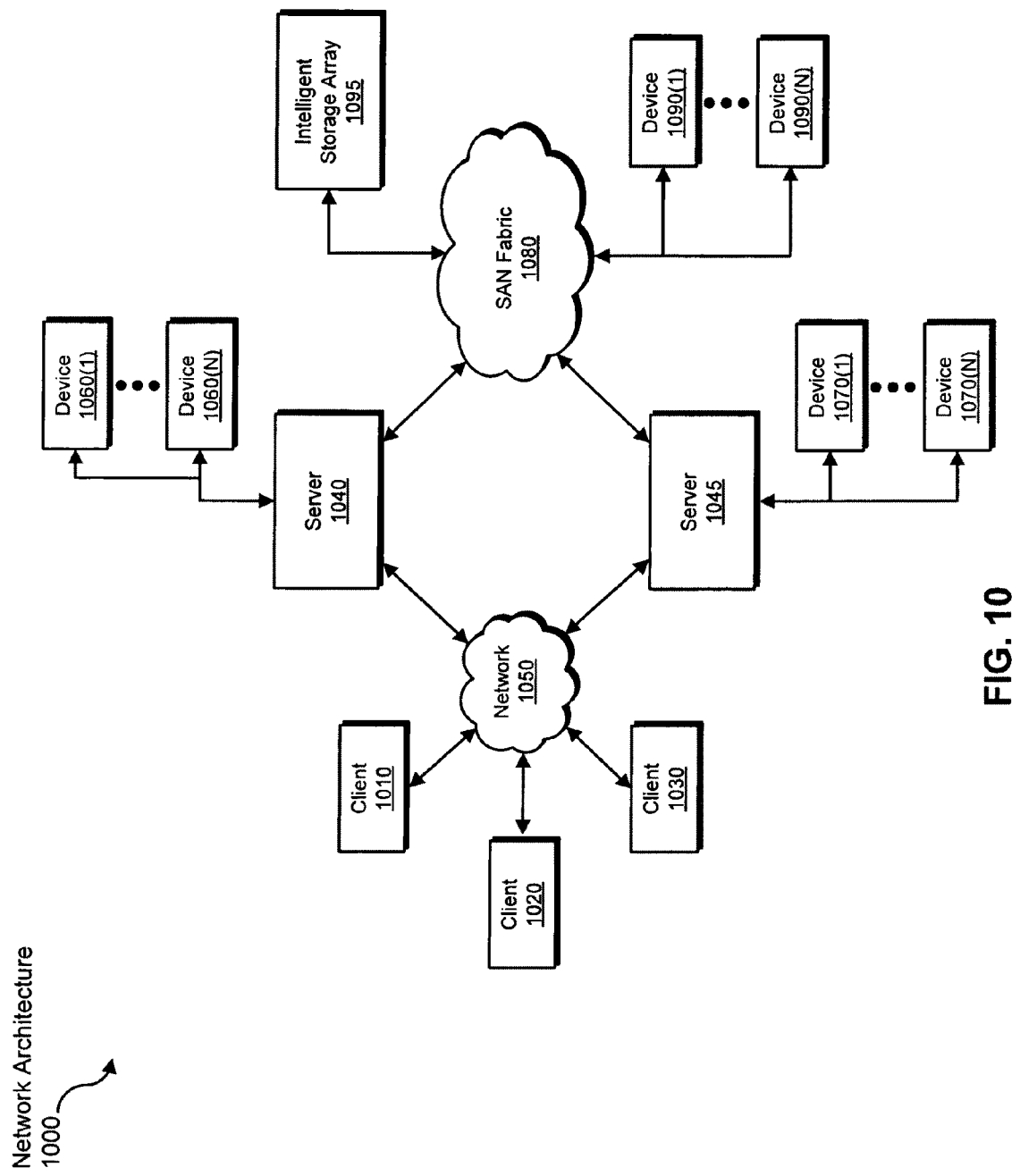
FIG. 10 is a block diagram of an exemplary network architecture in which client systems and servers may be coupled to a network.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or to run certain software applications. Network 1050 generally represents any telecommunication or computer network; including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing steps and features set forth in the instant disclosure.

Figure 11:
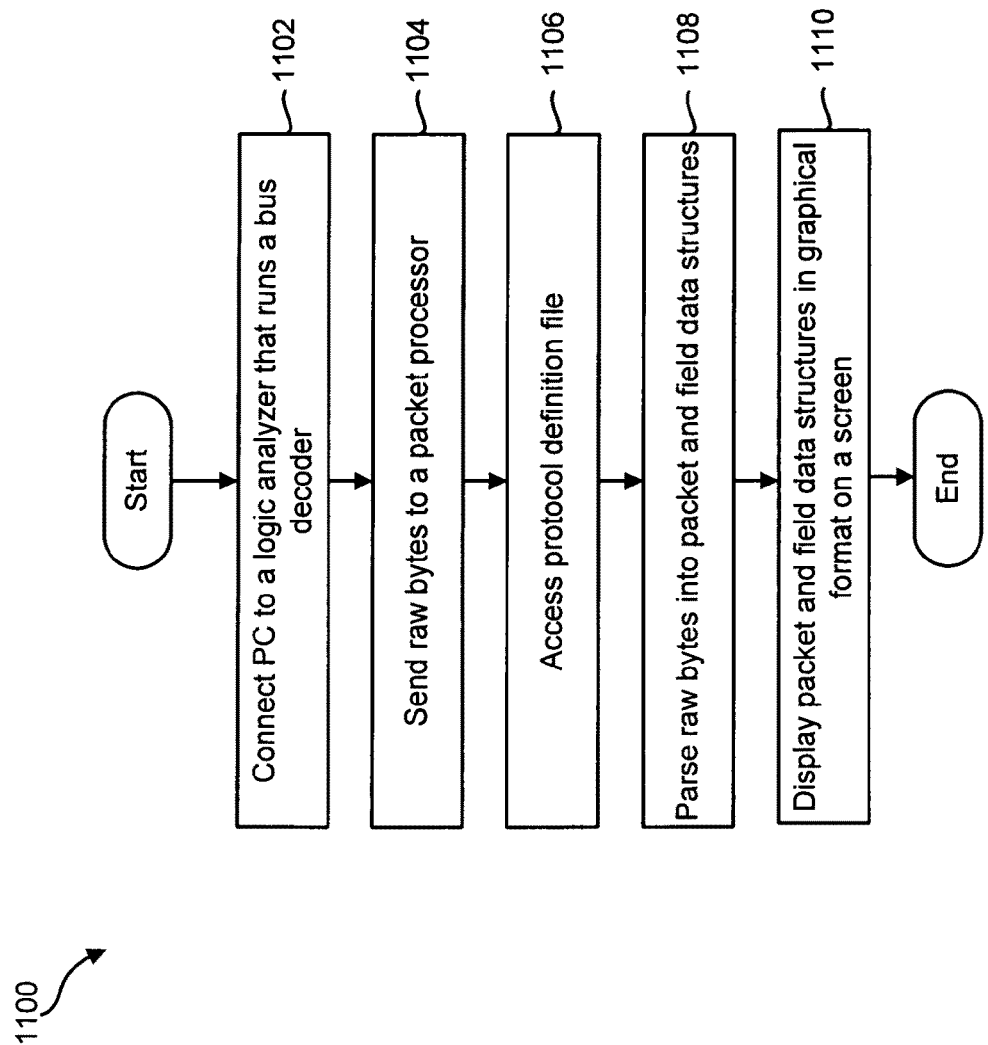
FIG. 11 is a flow diagram illustrating one embodiment of a method for connecting a logic analyzer to a computing device in order to decode bus data and provide the decoded data to a user in a graphical format on a screen.

FIG. 11 is a flow diagram illustrating one embodiment of a method 1100 for connecting a logic analyzer to a computing device and decoding bus data to be presented to a user. The logic analyzer that runs a bus decoder may be connected 1102 to a computing device, such as a personal computer. In some embodiment, the logic analyzer may be the USBee DX Test Pod provided by CWAV, Inc. located in Temecula, Calif. As previously described, certain modules may be modified so that the method 1100 may be implemented by other logic analyzers. The logic analyzer may be connected to a PC using a USB 2.0 bus connection. The software and module described herein may function with other logic analyzers by changing a few sections of the provided source code. For example, changes should be completed in the source code for the underlying dynamic link library (DLL) that contains all communications to the actual device. First, in this DLL, the initialization code that sets up the communication to the logic analyzer device, (i.e., the InitializeUSBeeDXPod( ) routine)

may be converted to initialize communication to the new logic analyzer. Calls to setup the USB Device communication with the USBee device may be replaced by the code that initializes communication to a third party logic analyzer. Second, the data acquisition section (i.e., the StartCapture( ) routine) may be converted to provide the raw logic analyzer sample data from the new device. Calls to start the USBee device capturing data may be replaced by code that instructs the new logic analyzer to start a trace capture. Third, code that formats the data from the Logic Analyzer (i.e., the StreamProc( ) and HandleData( ) routines) may gather the sample data and convert the sample format from the new logic analyzer into the existing PacketPresenter buffer format. In one embodiment, the StreamProc( ) routine may be modified to replace the code that requests captured data from the USBee to request data from the logic analyzer. In one configuration, the HadleData( ) routine may be changes to remove the formatting of the USBee raw data into the PacketPresenter internal buffer format and the routine may be replaced by code that formats the new logic analyzer raw data into the PacketPresenter internal data format.

Upon completion of the steps provided above, the software and modules described herein may operate with any existing logic analyzer. Examples of third party logic analyzers may include the logic analyzer provided at www.salea.com or the DigiView logic analyzer provided at www.tech-tools.com.

In some embodiments, the logic analyzer provides embedded bus protocol decoding and streaming for many of the common busses, such as, SPI, ASYNC, CAN, USB, ASYNC, 1-Wire, Serial, Parallel, PS/2, and SMBus. The logic analyzer extracts the bus data and sends 1104 raw bytes to a packet processor. In some embodiments, a protocol definition file may be accessed 1106 that defines the decoding procedures for a particular bus protocol. The logic analyzer may access different protocol definition files to decode data in accordance with various bus protocols.

The raw bytes may be parsed 1108 into packet and field data structures in accordance with the accessed protocol definition file and the packet and field data structures may be displayed 1110 in a graphical format to a user on a screen. The user may then analyze the graphical format to determine the location of errors that may need to be debugged and corrected.

It can thus be seen that certain of the disclosed systems and methods display bus traffic that is being transmitted between ICs or system components in a graphical, easy to understand packet format that can be customized to a specific design. In addition, certain disclosed systems and methods automatically count bits, decode protocols, and parse the embedded bus data into usable data fields. For example, some of the disclosed systems and methods translate standard logic analyzer traces into graphical communication packets that are recognizable to a user. In addition, certain embodiments of the disclosed systems and methods may decode multiple types of bus protocols in accordance with a user-defined bus protocol file. These files may be created and/or edited by a user so that any type of bus protocol may be tested. For example, certain of the present systems and methods may extract protocol information of interest from raw bus traffic and present it to a user in a clear and simple format.

In addition, the present systems and methods present communication packets in a format that is tailored to the design specification and bus protocol desired by the user. The data may be displayed in a constant packet format so that errors and/or anomalies may be easily discovered, and a user may implement debugging processes to correct the errors and/or anomalies. For example, the user may define a simplified packet presenter format to highlight just the area of data communications that may be causing a certain system malfunction. Then, while reproducing the malfunction, the packet presenter may be ran to capture the packet traffic during the occurrence. Then, the user may easily review the packet presenter data to locate first the symptoms of the malfunction contained in the packet data, and ultimately find the root cause of the error. Further, a user is able to filter and search through packetized data. In addition, the user is able to correlate actual voltage versus time waveforms of the bus traffic with raw bus logic data bytes, and the packet, field, and data of a higher level protocol.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for presenting data via a display on a first computing device according to a user-selected format, comprising:
    selecting, by a user, one of a plurality of data format structures, wherein the data structure comprises one or more predetermined data segments according to the selected data format structure, wherein the selected data format structure is associated with a protocol for an embedded communications bus;
    receiving a bus data stream on the embedded communications bus, the bus data stream comprising a plurality of data segments from a second device, the plurality of data segments being in one of a plurality of possible predetermined formats;
    accessing one of a plurality of protocol files corresponding to the protocol for the embedded communications bus;
    decoding the plurality of data segments in one or more data structures according to the protocol file associated with the selected data format structure; and
    displaying on a screen the contents of the one or more data structures, whereby the user analyzes the displayed contents and determines whether to execute debugging operations for the second device according to the contents of the displayed data structures.

2. The method of claim 1, wherein the displayed structures are displayed in a graphical format.

3. The method of claim 1, wherein the data structures comprise electronic communication packets.

4. The method of claim 1, wherein the user-selected format comprises a user-defined file that comprises a text file.

5. The method of claim 1, further comprising capturing traces of the encoded bus data stream to generate a voltage versus time waveform.

6. The method of claim 1, further comprising displaying a voltage versus time waveform and the decoded plurality of data segments on the screen.

7. The method of claim 1, wherein the user-selected format comprises instructions to combine a voltage versus time waveform, the decoded data segments, and the communication packets in a single display.

8. The method of claim 1, wherein the protocol for an embedded communication bus comprises the protocol for a controller-area network (CAN) bus, a Universal Serial Bus (USB), a 12C bus, an Async bus, a parallel bus, a 1-wire bus, a Serial Peripheral Interface (SPI) bus, a system management (SM) bus, or a serial bus.

9. A testing device that is configured to present data via a display according to a user-selected format, the testing device comprising:
    a processor;
    memory in electronic communication with the processor; and
    a logic analyzer module configured to:
        receive a user's selection of one of a plurality of data format structures, wherein the data structure comprises one or more predetermined data segments according to the selected data format structure, wherein the selected data format structure is associated with a protocol for an embedded communications bus;
        receive a bus data stream on the embedded communications bus, the bus data stream comprising a plurality of data segments from a second device, the plurality of data segments being in one of a plurality of possible predetermined formats;
        access one of a plurality of protocol files corresponding to the protocol for the embedded communications bus;
        decode the plurality of data segments in one or more data structures according to the protocol file associated with the selected data format structure; and
        display on a screen the contents of the one or more data structures, whereby a user analyzes the displayed contents and determines whether to execute debugging operations for the second device according to the contents of the displayed data structures.

10. The testing device of claim 9, wherein the logic analyzer module is further configured to provide the data structures to the display to be displayed in a graphical format.

11. The testing device of claim 9, wherein the data structures comprise electronic communication packets.

12. The testing device of claim 9, wherein the user-selected format comprises a user-defined file that comprises a text file.

13. The testing device of claim 9, wherein the logic analyzer module is further configured to capture traces of the encoded bus data stream to generate a voltage versus time waveform.

14. The testing device of claim 9, wherein the logic analyzer module is further configured to provide a voltage versus time waveform and the decoded plurality of data segments to the display.

15. The testing device of claim 9, wherein the user-selected format comprises instructions to combine a voltage versus time waveform, the decoded data segments, and the communication packets in a single display.

16. The testing device of claim 9, wherein the protocol for an embedded communication bus comprises the protocol for a controller-area network (CAN) bus, a Universal Serial Bus (USB), a 12C bus, an Async bus, a parallel bus, a 1-wire bus, a Serial Peripheral Interface (SPI) bus, a system management (SM) bus, or a serial bus.

17. A non-transitory computer-readable medium comprising executable instructions for:

selecting, by a user, one of a plurality of data format structures, wherein the data structure comprises one or more predetermined data segments according to the selected data format structure, wherein the selected data format structure is associated with a protocol for an embedded communications bus;

receiving a bus data stream on the embedded communications bus, the bus data stream comprising a plurality of data segments from a second device, the plurality of data segments being in one of a plurality of possible predetermined formats;

accessing one of a plurality of protocol files corresponding to the protocol for the embedded communications bus;

decoding the plurality of data segments in one or more data structures according to the protocol file associated with the selected data format structure; and displaying on a screen the contents of the one or more data structures, whereby the user analyzes the displayed contents and determines whether to execute debugging operations for the second device according to the contents of the displayed data structures.

18. The non-transitory computer-readable medium of claim 17, wherein the displayed structures are displayed in a graphical format.

\* \* \* \* \*